United States Patent
Mikkonen et al.

(10) Patent No.: US 7,746,396 B2
(45) Date of Patent: Jun. 29, 2010

(54) IMAGING DEVICE AND METHOD OF CREATING IMAGE FILE

(75) Inventors: Sami Mikkonen, Oulu (FI); Jaakko Kylmänen, Oulu (FI)

(73) Assignee: Nokia Corporation, Espoo (FI)

( * ) Notice: Subject to any disclaimer, the term of this patent is extended or adjusted under 35 U.S.C. 154(b) by 1122 days.

(21) Appl. No.: 10/738,562

(22) Filed: Dec. 17, 2003

(65) Prior Publication Data

US 2005/0134697 A1    Jun. 23, 2005

(51) Int. Cl.
*H04N 9/083* (2006.01)
*H04N 3/14* (2006.01)
*H04N 5/335* (2006.01)
*H04N 9/04* (2006.01)

(52) U.S. Cl. .............. 348/276; 348/164; 348/272; 348/273; 348/278; 348/279; 348/380

(58) Field of Classification Search ............ 348/164, 348/272–280

See application file for complete search history.

(56) References Cited

U.S. PATENT DOCUMENTS

| | | | |
|---|---|---|---|
| 5,555,464 A | 9/1996 | Hatlestad | |
| 6,292,212 B1 | 9/2001 | Zigadlo et al. | |
| 6,515,275 B1 | 2/2003 | Hunter et al. | |
| 6,825,470 B1 | 11/2004 | Bawolek et al. | |
| 7,012,643 B2 | 3/2006 | Frame | |
| 7,095,441 B2 * | 8/2006 | Nagano | 348/308 |
| 2002/0140822 A1 * | 10/2002 | Kahn et al. | 348/207.99 |
| 2002/0152557 A1 * | 10/2002 | Elberbaum | 8/405 |
| 2004/0105021 A1 * | 6/2004 | Hu | 348/272 |
| 2004/0174446 A1 * | 9/2004 | Acharya | 348/279 |
| 2007/0002149 A1 * | 1/2007 | Oda | 348/222.1 |

FOREIGN PATENT DOCUMENTS

| | | | |
|---|---|---|---|
| JP | 2001-069519 A | * | 3/2001 |
| JP | 2002-084534 | | 3/2002 |
| JP | 2002-142228 | | 5/2002 |
| JP | 2005-006066 | | 1/2005 |
| JP | 2005-525052 | | 8/2005 |

* cited by examiner

*Primary Examiner*—Sinh Tran
*Assistant Examiner*—Anthony J Daniels
(74) *Attorney, Agent, or Firm*—Hollingsworth & Funk, LLC

(57) ABSTRACT

A method of creating an image file in an imaging device, and an imaging device are provided. The method comprises providing an image sensor comprising pixels with an infrared filter arrangement so that some of the pixels of the sensor may be exposed to all wavelengths and some of the pixels of the sensor are blocked from infrared wavelengths. The pixels of the sensor that may be exposed to all wavelengths are utilized when taking an infrared image and the pixels of the sensor that are blocked from infrared wavelengths are utilized when taking a normal image.

18 Claims, 2 Drawing Sheets

IMAGING DEVICE AND METHOD OF CREATING IMAGE FILE

FIELD

The invention relates to an imaging device. Especially the invention relates to a digital imaging device, and a method of creating an image in a digital imaging device.

BACKGROUND

The popularity of photography is continuously increasing. This applies especially to digital photography as the supply of inexpensive digital cameras has improved. Also the integrated cameras in mobile phones have contributed to the increase in the popularity of photography.

Digital imaging and image manipulation have many advantages over conventional film photography. Digital images can be archived and manipulated electronically and the digital form of images offers several possibilities.

Digital imaging devices utilize an imaging sensor, which is a light sensitive device. An imaging sensor detects light and outputs an electrical current which is in proportion to the detected light. Sensors are typically based on silicon technology. A problem with imaging sensors is that it is sensitive not only to visible light but also to infrared radiation. Infrared radiation, or infrared light, is typically defines as light having a wavelength longer than 780 nm. Infrared light distorts images in daytime conditions. Color balance in color images or the balance of dark and light areas in black and white imaging distorts if infrared light reaches the imaging sensor. Thus, in daytime conditions infrared light is blocked from reaching the imaging sensor by placing an infrared blocking filter in front of the imaging sensor.

However, sometimes in dark conditions, when there is very little or no visible light, it is possible to take images by utilizing infrared light. By utilizing an external infrared light source it is possible to take images even without the subject of imaging being aware of the imaging process. This may be advantageous especially in observation cameras, which are used as burglar alarms, for example.

Thus, imaging devices should block infrared light from reaching the sensor in daytime conditions but yet enable infrared imaging in dark conditions. In prior art solutions, a removable infrared block filter or a leaky infrared filter has been used. An infrared filter may be a separate part in an objective of a camera. In dark conditions, the infrared filter may be mechanically removed in front of the objective or the sensor of the camera. This removal may be realized automatically or manually. A drawback of this solution is that it is quite expensive and the long term durability is uncertain because of the moving parts required in the solution. In some infrared filter solutions, some of the infrared light is passed to the sensor. For example, when an external infrared light source is used in dark conditions, the infrared filter is designed to pass the wavelength of the light emitted by the light source through but block all other wavelengths. This solution is a compromise in both daylight and dark conditions and the resulting images are not optimal.

BRIEF DESCRIPTION OF THE INVENTION

An object of the invention is to provide an improved solution for imaging in both daytime and dark conditions. According to an embodiment of the invention, there is provided an imaging device comprising an image sensing arrangement comprising a lens and an image sensor comprising pixels, the image sensing arrangement being arranged to produce an image, the image sensing arrangement further comprising an infrared filter arrangement in front of the image sensor so that some of the pixels of the sensor are exposed to all wavelengths and some of the pixels of the sensor are blocked from infrared wavelengths.

According to another embodiment of the invention, there is provided a method of creating an image file in an imaging device, the method comprising providing an image sensor comprising pixels with an infrared filter arrangement so that some of the pixels of the sensor may be exposed to all wavelengths and some of the pixels of the sensor are blocked from infrared wavelengths; utilizing the pixels of the sensor that may be exposed to all wavelengths when taking an infrared image and utilizing the pixels of the sensor that are blocked from infrared wavelengths when taking a normal image.

The method and device of the invention provide several advantages. Compared to a mechanically removable filter, the proposed solution provides a robust solution with no moving parts. The solution is very cost effective as no extra parts are required and the related processing may be performed during normal equipment manufacturing phases. The solution also provides a very fast switch from normal imaging to infrared imaging, and vice versa. Compared to a leaky infrared filter the proposed solution provides an enhanced image quality.

LIST OF DRAWINGS

In the following, the invention will be described in greater detail with reference to preferred embodiments and the accompanying drawings, in which FIG. 1 illustrates an example of an imaging device of an embodiment;

DESCRIPTION OF EMBODIMENTS

Figure 1:
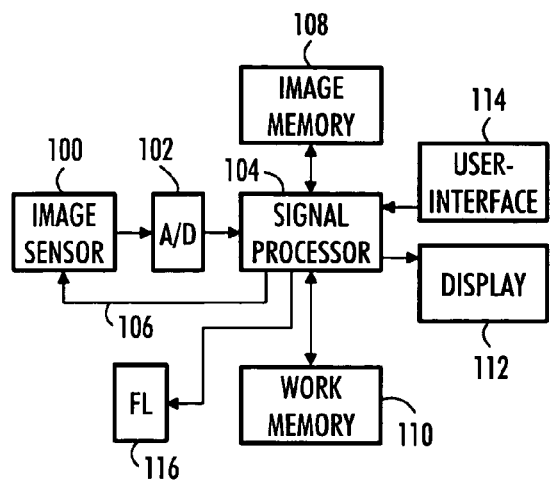

FIG. 1 illustrates a generalized digital image device which may be utilized in some embodiments of the invention. It should be noted that embodiments of the invention may also be utilized in other kinds of digital cameras than the apparatus of FIG. 1, which is only an example of a possible structure.

The apparatus of FIG. 1 comprises an image sensing arrangement 100. The image sensing arrangement comprises a lens assembly and an image sensor. The structure of the arrangement 100 will be discussed in more detail later. The image sensing arrangement captures an image and converts the captured image into an electrical form. The electric signal produced by the apparatus 100 is led to an A/D converter 102 which converts the analogue signal into a digital form. From the converter the digitized signal is taken to a signal processor 104. The image data is processed in the signal processor to create an image file. The output signal of the image sensing arrangement 100 contains raw image data which needs post processing, such as white balancing and color processing. The signal processor is also responsible for giving exposure control commands 106 to the image sensing arrangement 100.

The apparatus may further comprise an image memory 108 where the signal processor may store finished images, a work memory 110 for data and program storage, a display 112 and a user interface 114, which typically comprises a keyboard or corresponding means for the user to give input to the apparatus.

Figure 2:
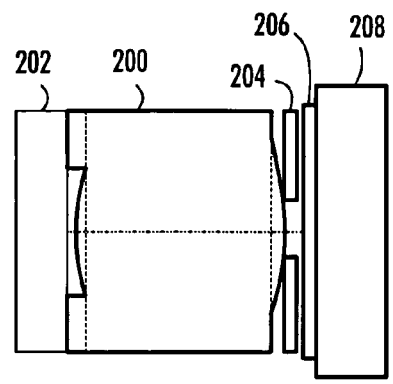
FIG. 2 illustrate an example of an image sensing arrangement.

FIG. 2 illustrates an example of an image sensing arrangement 100. In this example, the image sensing arrangement comprises a lens 200, an image sensor 202, an aperture plate 204, a color filter arrangement 206 and an infrared filter 208.

The image sensing arrangement of FIG. 2 is thus able to form an image on the image sensor 202. The image sensor 202 is typically, but not necessarily, a single solid-state sensor, such as a CCD (Charged Coupled Device) or CMOS (Complementary Metal-oxide Semiconductor) sensor known to one skilled in the art. The image sensor 202 converts light into an electric current. This electric analogue signal is converted in the image capturing apparatus into a digital form by the A/D converter 102, as illustrated in FIG. 1. The sensor 202 comprises a given number of pixels. The number of pixels in the sensor determines the resolution of the sensor. Each pixel produces an electric signal in response to light. The number of pixels in the sensor of an imaging apparatus is a design parameter. Typically in low cost imaging apparatus the number of pixels may be 640×480 along the long and short sides of the sensor. A sensor of this resolution is often called a VGA sensor. In general, the higher the number of pixels in a sensor, the more detailed image the sensor is able to produce.

The aperture plate 204 controls the amount of light passed to the sensor through the lens. It should be noted that the structure of the aperture plate is irrelevant to the embodiments, i.e. the aperture value of the aperture plate may be fixed, or it may be adjusted either automatically based on measurements or by hand.

The lens 200 forms an image onto the sensor from the incoming light. The structure and the properties of the lens are irrelevant to the embodiments of the invention.

The image sensor 202 is sensitive to light and it produces an electric signal when exposed to light. However, the sensor is unable to differentiate different colors from each other. Thus, the sensor as such produces only black and white images. A number of solutions are proposed to enable a digital imaging apparatus to produce color images. It is well known to one skilled in the art that a full color image can be produced using only three basic colors in the image capturing phase. A generally used combination of three suitable colors consists of red, green and blue (RGB). Another widely used combination consists of cyan, magenta and yellow (CMY). Also other combinations are possible. Although all colors can be synthesized using three colors, also other solutions are available, such as RGBE, where emerald is used as the fourth color.

One solution used in single lens digital image capturing apparatus is to provide a color filter array in front of the image sensor, the filter consisting of a three-color pattern of RGB or CMY colors, for example. Such a solution is often called a Bayer matrix. When using an RGB Bayer matrix filter, each pixel is typically covered by a filter of a single color in such a way that in the horizontal direction, every other pixel is covered with a green filter and every other pixel is covered by a red filter on every other line and by a blue filter on every other line. A single color filter passes through to the sensor pixel under the filter light which wavelength corresponds to the wavelength of the single color. The signal processor interpolates the image signal received from the sensor in such a way that all pixels receive a color value for all three colors. Thus a color image can be produced.

Figure 3A:
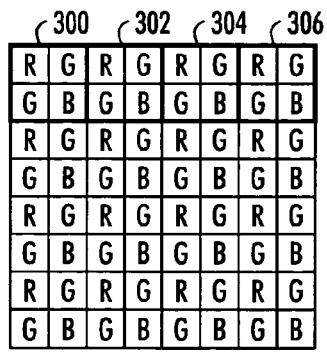
FIGS. 3A to 3F illustrate examples of color matrix filters and infrared filter arrays.

FIG. 3A illustrates an example of an RGB color matrix filter. FIG. 3A shows an 8×8 color filter array. The filter covers a respective 8×8 pixel area on the image sensor. Red filters are denoted with a letter 'R', blue filters are denoted with a letter 'B', and green filters are denoted with a letter 'G'. In an embodiment, the pixels of the image sensor and of the color matrix filter are grouped into 2×2 pixel subarrays. Each subarray comprises a red filter, a blue filter and two green filters. The array of FIG. 3A thus comprises 16 subarrays. For example, on the first line, the array has subarrays 300 to 306. The signal processor of the imaging device processes the image signal received from the sensor subarraywise by interpolating the signals of the pixels of each subarray so that all pixels in the subarray receive a color value for all three colors. Thus a color image can be produced.

Figure 3B:
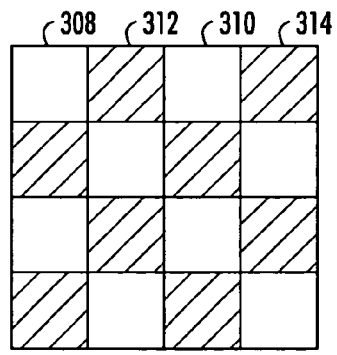

In an embodiment, an infrared filter arrangement 208 is placed in front of the pixel sensor array so that some of the pixels of the array may be exposed to all wavelengths and some of the pixels of the sensor array are blocked from infrared wavelengths. FIG. 3B illustrates an example of an infrared filter arrangement. FIG. 3B shows an 8×8 pixel infrared filter array. Thus, the filter array covers a respective 8×8 pixel area on the image sensor. The filter comprises areas, blocking infrared light and areas which pass infrared light-through. The non-blocking areas are hatched. Thus, on the top row, the array comprises areas 308 and 310 which block infrared light and areas 312 and 314 which pass infrared light through. In this example, each area covers a 2×2 pixel area from the image sensor.

Referring to the example of FIG. 3A, the infrared filter arrangement and the color matrix filter are both in front of the image sensor and they may be placed on top of each other. Each 2×2 area of FIG. 3B covers a 2×2 subarray of FIG. 3A. Thus, infrared light is passed through subarrays 302 and 306, but blocked from subarrays 300 and 304.

Figure 3C:
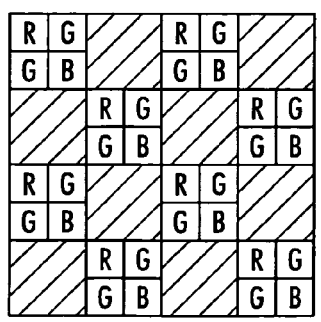

FIG. 3C illustrates an example where the filter arrays are placed on top of each other. Every other color matrix filter subarray is blocked from infrared light. The pixels under subarrays which are blocked from infrared light are utilized when normal images are taken. The pixels under subarrays which are not blocked from infrared light are utilized when infrared images are taken.

Figure 3D:
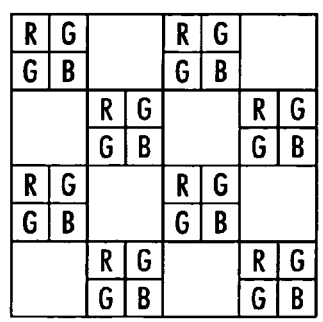

The infrared filter array may be taken into account when manufacturing the color matrix filter. FIG. 3D illustrates an example of an RGB color matrix filter where every other 2×2 subarray is covered by a color filter arrangement and every other subarray comprises no color filters. When an infrared filter arrangement is placed on top of the color matrix filter, these subarrays that are not blocked from infrared light are utilized when infrared images are taken. The color matrix filter is thus unnecessary for these subarrays.

Figure 3E:
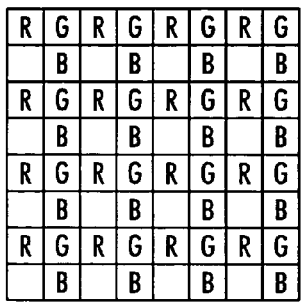
Figure 3F:
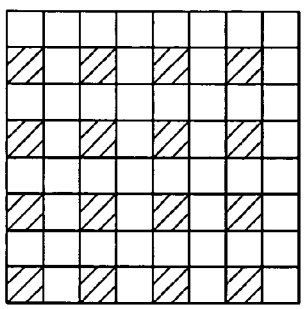

In an embodiment, the pixels of the image sensor and of the color matrix filter are grouped into 2×2 pixel subarrays, each subarray thus comprising four pixels. In this embodiment, three pixels of the subarray are blocked from infrared wavelengths and utilized in color imagining, and one pixel is exposed to all wavelengths and utilized in infrared imaging. FIGS. 3E and 3F illustrate this embodiment. FIG. 3E illustrates the color matrix filter. One green filter in each subarray is omitted. Thus, each subarray comprises a red, a blue and a green filter. FIG. 3F illustrates the infrared filter arrangement. In each subarray, the arrangement comprises an infrared blocking area of the size of three pixels and an area of the size of a pixel passing infrared light through. The infrared passing area is placed on top of the missing green filter on the color matrix filter. In practice, the second green filter is replaced by an infrared passing filter. Thus, the three pixels of each subarray covered by an infrared blocking filter are utilized in normal color imagining and the pixel which is exposed to infrared light is utilized in infrared imagining.

The size of the subarray may also be other than 2×2. For example, with a 3×3 subarray, a 3×3 color matrix filter comprising three pixels of each three colors may be used. In an embodiment of the invention, the corresponding 3×3 infrared filter arrangement comprises an infrared blocking area and an infrared passing area.

In an embodiment, the imaging device is configured to detect the amount of light in the area to be imaged and to determine whether an infrared image or a normal image is to be taken. Referring to FIG. 1, the signal processor 104 is configured to take a test image using the image sensor 100, and analyze the test image and determine the amount of light in the vicinity of the image sensor. If the amount of light in the test image is small, the signal processor determines that an infrared image is required. Respectively, if the amount of light in the test image is large, the signal processor determines that a normal image will give better results. This method is advantageous especially in observation cameras which take images automatically without any human interaction.

In an embodiment, the imaging device comprises a flashlight 116 or a light source of an infrared wavelength. Referring to FIG. 1, the signal processor 104 controls the operation of the flashlight 116. If the signal processor has determined that an infrared image is required, it uses the flashlight in synchronization with the image sensor to produce an infrared image. This operation mode is particularly advantageous in observation cameras which are to take images automatically without the subject being aware of the imaging.

In an embodiment, the flashlight is similar to a normal flashlight or a combination of an infrared and normal flashlight.

Figure 4:
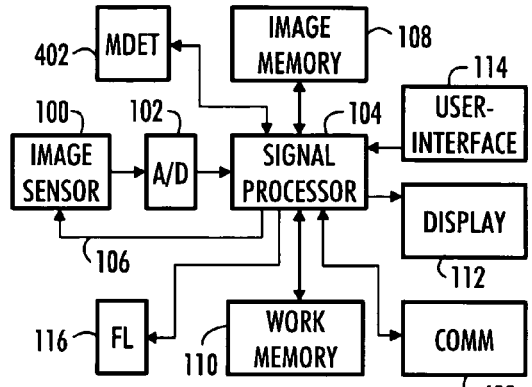
FIG. 4 illustrates another example of an imaging device.

FIG. 4 illustrates another digital imaging device which may be utilized in some embodiments of the invention. This embodiment is suitable for use as an observation camera, for example. The device of FIG. 4 comprises an image sensing arrangement 100 comprising a lens assembly and an image sensor. The device further comprises an A/D converter 102 and a signal processor 104. The image data is processed in the signal processor to create an image file. The signal processor gives exposure control commands 106 to the image sensing arrangement 100. The apparatus further comprises an image memory 108, a work memory 110 for data and program storage, a display 112, a flashlight 116 and, a user interface 114, as discussed in connection with FIG. 1.

The device further comprises movement detection means 402. The movement detection means are configured to detect movement in a desired area in front of the device. The means monitor the desired area and when movement is detected the means send a signal to the signal processor 104. The signal processor is configured to take an image when the movement detection means have detected movement in front of the device.

The movement detection means 402 may be realized using movement detectors known to one skilled in the art, such as infrared detectors, for example.

The device further comprises communication means 400. The communication means are arranged to send images to predetermined addresses. When the signal processor has taken an image after receiving a signal from the movement detector, the signal processor is configured to send the image to a predetermined address. The communication means may be realized using a cellular radio system transceiver, for example. The image may be sent as a multimedia message (MMS) to another transceiver. The communication means may also be realized using a wireline modem, a short range radio transmitter, such as Bluetooth, or a wireless local area network (WLAN) transceiver. The communication means may also be realized using other types of transceivers.

A user of the device may program the parameters of the movement detection means 402 and the communication means 400 via the signal processor using the user interface 114. The parameters in question may include the coverage area and sensitivity of the movement detection means and the communication method and the address used in transmitting the images.

Figure 5A:
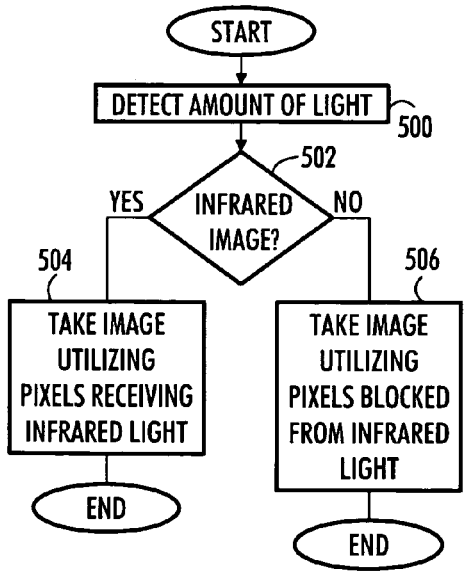
FIGS. 5A and 5B are flowcharts illustrating embodiments of the invention.

FIG. 5A is a flowchart illustrating an embodiment of the invention. The embodiment relates to the device of FIG. 1. In step 500, the device detects the amount of light in the area to be photographed. In step 502, the device selects whether to take an infrared image or a normal image on the basis of the detected amount of light. If the amount of light is small, it is more useful to take an infrared image. This is taken in step 504 by utilizing the pixels of the sensor of the device that are exposed to all wavelengths.

If there is enough light a normal color image is preferred. This is taken in step 506 by utilizing the pixels of the sensor of the device that are blocked from infrared wavelengths.

Figure 5B:
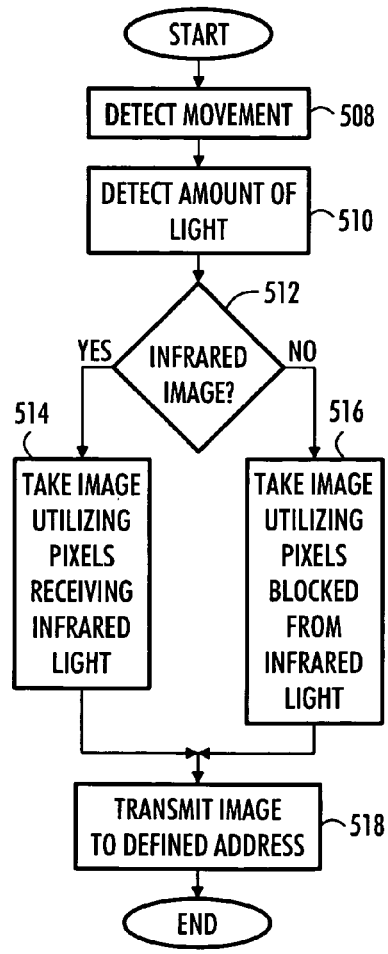

FIG. 5B is a flowchart illustrating another embodiment of the invention. The embodiment relates to the device of FIG. 4. In step 508, the movement detection means detect movement in the monitored area. On the basis of the detection, an imaging process is initiated by the signal processor. In step 510, the device detects the amount of light in the monitored area. In step 512, the device selects whether to take an infrared image or a normal image on the basis of the detected amount of light. If the amount of light is small, it is more useful to take an infrared image in step 514 by utilizing the pixels of the sensor of the device that are exposed to all wavelengths.

If there is enough light, a normal color image is taken in step 516 by utilizing the pixels of the sensor of the device that are blocked from infrared wavelengths. In step 518 the taken image is transmitted by the communication means to a predetermined address.

Even though the invention has been described above with reference to an example according to the accompanying drawings, it is clear that the invention is not restricted thereto but it can be modified in several ways within the scope of the appended claims.

The invention claimed is:

1. A device comprising:
   an image sensing arrangement arranged to produce an image including
      a lens,
      an image sensor comprising pixels,
      an infrared filter arrangement in front of the image sensor so that some of the pixels of the sensor are exposed to all wavelengths and some of the pixels of the sensor are blocked from infrared wavelengths such that the image sensing arrangement is configured to form an infrared image by utilizing the pixels of the image sensor that may be exposed to all wavelengths and form an image using visible light by utilizing the pixels of the image sensor that are blocked from infrared wavelengths,
   wherein the pixels of the image sensor are grouped into 2×2 pixel subarrays and every pixel in every other subarray is blocked from infrared wavelengths, and
   a memory for storing infrared images and images formed using visible light.

2. The device of claim 1, wherein half of the pixels of the sensor are exposed to all wavelengths and half of the pixels of the sensor are blocked from infrared wavelengths.

3. The device of claim 1, the image sensing arrangement further comprising a color filter arrangement in front of the image sensor.

4. The device of claim 1, the image sensing arrangement further comprising a color filter arrangement in front of the pixels blocked from infrared wavelengths.

5. The device of claim 1, wherein the color filter arrangement is a Bayer matrix filter.

6. The device of claim 1, wherein at least one pixel of half of the 2×2 pixel subarrays is exposed to all wavelengths.

7. The device of claim 1, wherein every pixel in every other subarray is covered with a color matrix filter.

8. The device of claim 1, wherein every pixel in every other subarray that is blocked from infrared wavelengths covered with a color matrix filter.

9. The device of claim 1, wherein an image sensor area comprises two separate areas wherein the infrared filter arrangement covers a first area and a color matrix filter covers a second area.

10. The device of claim 1, wherein the device is configured to utilize the pixels of the image sensor that may be exposed to all wavelengths when taking an infrared image.

11. The device of claim 1, wherein the device is configured to utilize the pixels of the image sensor that are blocked from infrared wavelengths when taking a normal image.

12. The device of claim 1, further comprising a flashlight of an infrared wavelength.

13. The device of claim 1, further comprising means for detecting the amount of light in the area to be imaged and means to determine whether an infrared image or a normal image is to be taken.

14. A method comprising:

providing an image sensor comprising pixels with an infrared filter arrangement so that some of the pixels of the sensor may be exposed to all wavelengths and some of the pixels of the sensor are blocked from infrared wavelengths, wherein the pixels of the image sensor are grouped into 2×2 pixel subarrays and every pixel in every other subarray is blocked from infrared wavelengths, utilizing the pixels of the sensor that may be exposed to all wavelengths when taking an infrared image, utilizing the pixels of the sensor that are blocked from infrared wavelengths when taking a normal image, and storing infrared images and normal images in a memory.

15. The method of claim 14, further comprising covering the image sensor array with a color filter arrangement.

16. The method of claim 14, further comprising covering the pixels blocked from infrared wavelengths with a color filter arrangement.

17. The method of claim 14, further comprising:

detecting the amount of light, and selecting whether to take an infrared image or a normal image on the basis of the detection.

18. The method of claim 14, further comprising covering every pixel in every other subarray with a color matrix filter.

* * * * *